US009014319B1

(12) United States Patent
Copeland

(10) Patent No.: US 9,014,319 B1
(45) Date of Patent: Apr. 21, 2015

(54) CANCELLATION PULSE CREST FACTOR REDUCTION

(71) Applicant: Xilinx, Inc., San Jose, CA (US)

(72) Inventor: Gregory C. Copeland, Savannah, TX (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 14/088,221

(22) Filed: Nov. 22, 2013

(51) Int. Cl.
*H04B 1/10* (2006.01)
*H04L 1/00* (2006.01)

(52) U.S. Cl.
CPC .................................. *H04L 1/0033* (2013.01)

(58) Field of Classification Search
USPC .................. 375/296, 260, 297, 267
See application file for complete search history.

(56) References Cited

U.S. PATENT DOCUMENTS

| 8,457,249 | B2* | 6/2013 | Gotman et al. | 375/297 |
| 8,724,721 | B2* | 5/2014 | Soler Garrido | 375/260 |
| 2004/0218689 | A1* | 11/2004 | Akhtman | 375/296 |
| 2006/0014500 | A1 | 1/2006 | Marsili | |
| 2011/0258244 | A1* | 10/2011 | Kang | 708/207 |
| 2013/0251055 | A1* | 9/2013 | Yu et al. | 375/260 |
| 2014/0169496 | A1* | 6/2014 | Yang et al. | 375/296 |

OTHER PUBLICATIONS

Bassam, S., et al., "2-D Digital Predistortion (2-D-DPD) Architecture for Concurrent Dual-Band Transmitters" IEEE Transactions on Microware Theory and Techniques, vol. 59, No. 10, Oct. 2011, 2011 IEEE, pp. 2547-2553.
Ding, L., et al., "Concurrent Dual-Band Digital Predistortion", Texas Instruments, 2012 IEEE MTT-S International, Jun. 17-22, 2012, pp. 1-5, Montreal, QC, CA.
Roblin, P., et al., "Frequency-Selective Predistortion Linearization of RF Power Amplifiers", IEEE Transactions on Microwave Theory and Techniques, vol. 56, No. 1, Jan. 2008, 2007 IEEE, pp. 65-76.
Vaananen, O., et al.; "Reducing the Peak to Average Ratio of Multicarrier GSM and Edge Signals", Electronic Circuit Design Laboratory, Helsinki University of Technology, IEEE PIMRC 2002, Sep. 15-18, 2002, pp. 1-5, Lisbon, Portugal.

\* cited by examiner

*Primary Examiner* — Eva Puente
(74) *Attorney, Agent, or Firm* — W. Eric Webostad; Frederick Hsu

(57) ABSTRACT

An apparatus relates generally to crest factor reduction. In this apparatus, a finite impulse response filter provides a first cancellation pulse and a second cancellation pulse. A first adder is coupled to receive an input signal and the first cancellation pulse to provide a first difference signal. A peak engine is coupled to receive the first difference signal to provide a cancellation pulse value responsive to the first difference signal. The finite impulse response filter is coupled to receive the cancellation pulse value to provide each of the first cancellation pulse and the second cancellation pulse. A delay is coupled to receive the input signal to provide a delayed input signal. A second adder is coupled to receive the delayed input signal and the second cancellation pulse to provide a second difference signal. The second difference signal is a crest factor reduced version of the delayed input signal.

20 Claims, 8 Drawing Sheets

CANCELLATION PULSE CREST FACTOR REDUCTION

FIELD OF THE INVENTION

The following description relates to integrated circuit devices ("ICs"). More particularly, the following description relates to cancellation pulse crest factor reduction for an IC.

BACKGROUND

Base stations and other transmitters are increasingly incorporating more radio access technologies. Furthermore, traffic through such base stations and other transmitters is increasing. Accordingly, reducing latency and/or complexity for crest factor reduction ("CFR") in signals to be transmitted would be desirable and useful.

SUMMARY

An apparatus relates generally to crest factor reduction. In such an apparatus, a finite impulse response filter is configured to provide a first cancellation pulse and a second cancellation pulse. A first adder is coupled to receive an input signal and the first cancellation pulse to provide a first difference signal. A peak engine is coupled to receive the first difference signal and configured to provide a cancellation pulse value responsive to the first difference signal. The finite impulse response filter is coupled to receive the cancellation pulse value to provide each of the first cancellation pulse and the second cancellation pulse. A delay is coupled to receive the input signal to provide a delayed input signal. A second adder is coupled to receive the delayed input signal and the second cancellation pulse to provide a second difference signal. The second difference signal is a crest factor reduced version of the delayed input signal.

A method relates generally to crest factor reduction. In such a method, a magnitude or magnitude squared of an input signal is obtained. A peak of the input signal is detected with a peak detector. A fractional time offset associated with detection of the peak is determined. A peak magnitude and a peak location of the peak detected are found by interpolation. Determining whether the peak magnitude is greater than a threshold value. A complex interpolated cancellation pulse value is found for a cancellation pulse gain for the peak magnitude greater than the threshold value. A cancellation pulse with the cancellation pulse gain is generated. The cancellation pulse is output for the crest factor reduction.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
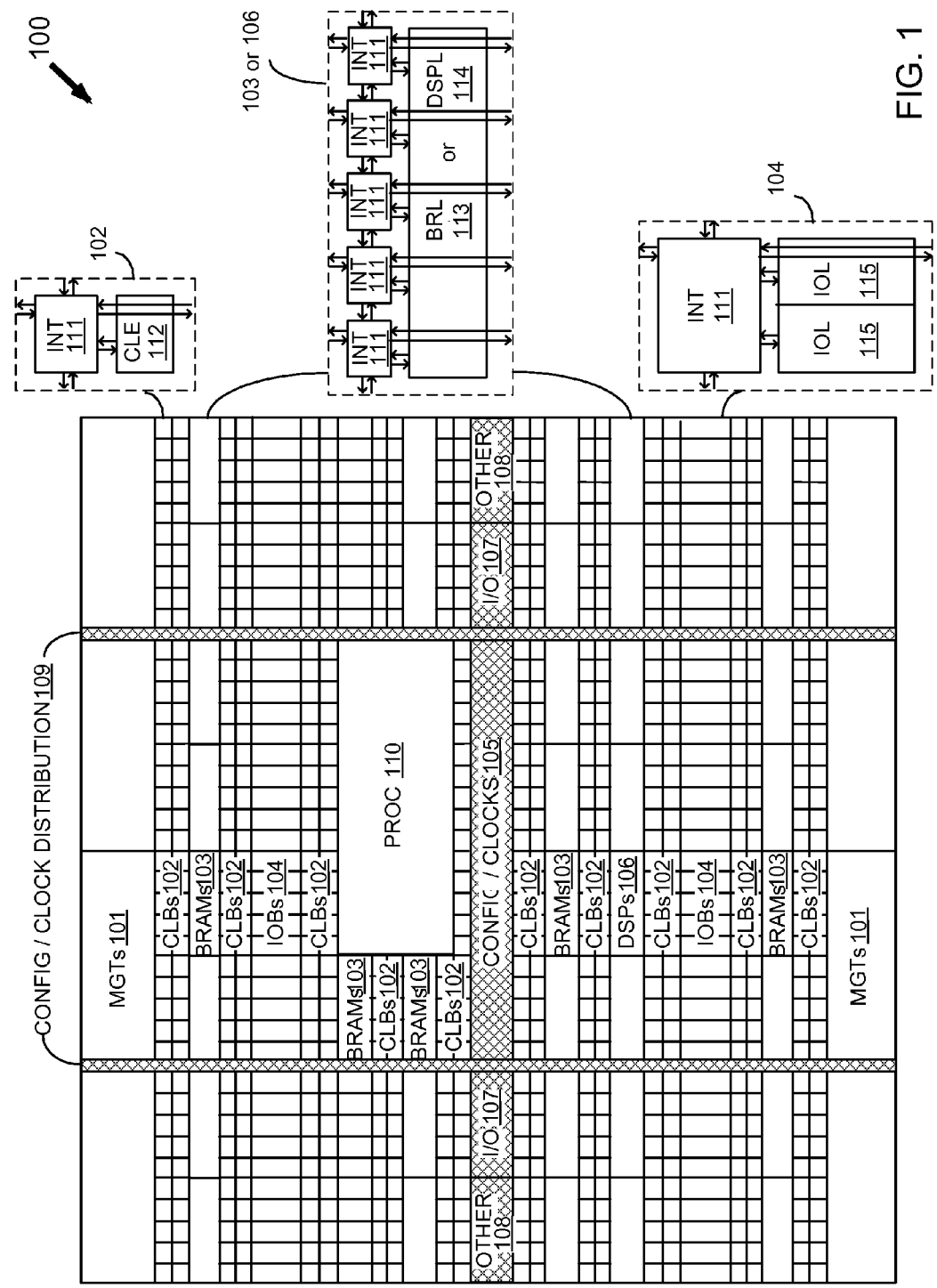
FIG. 1 is a simplified block diagram depicting an exemplary columnar Field Programmable Gate Array ("FPGA") architecture.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding. Generally, conventional window crest factor reduction ("CFR") is either too low performing or involves multiple stages to obtain sufficient performance for some applications. Having multiple stages increases latency, as well as complexity, and may not be suitable for some applications, including without limitation multi-radio access technologies. Conventional cancellation pulse applications correlates prior and future cancellation pulses with a current cancellation pulse, which in some applications over or under suppresses a peak responsive to an applied complex gain. Such correlation involves multiple passes, which increases latency and complexity, and may not be suitable for some applications, including without limitation multi-radio access technologies.

CFR is described below which may be performed in a single stage and in a single pass with sufficient performance for some applications, including without limitation multi-radio access technologies. More particularly, a peak engine is described that generates a complex cancellation pulse gain. Such peak engine may have a look-ahead to improve performance. Furthermore such peak engine may be configured to perform a fit for a detected peak, as well as support a fractional offset. Additionally, a cancellation pulse generator is described which produces a more accurate cancellation pulse for cancellation in a single pass.

With the above general understanding borne in mind, various configurations for a cancellation pulse-CFR engine are generally described below.

Because one or more of the above-described examples are described herein using a particular type of IC, a detailed description of such an IC is provided below. However, it should be understood that other types of ICs may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hardcoded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
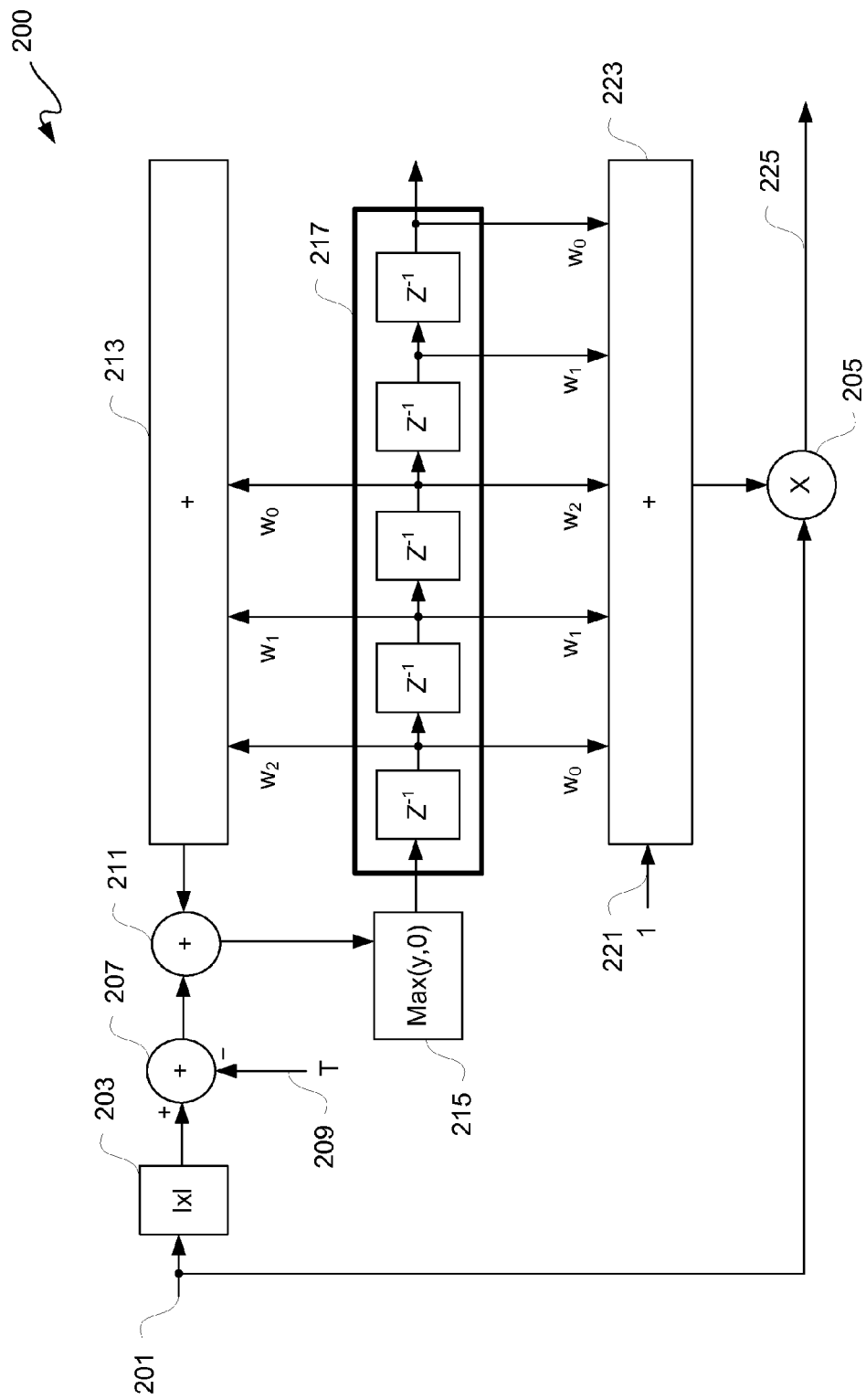
FIG. 2 is a block diagram depicting an exemplary conventional window crest factor reduction ("CFR") engine.

FIG. 2 is a block diagram depicting an exemplary conventional window-CFR engine 200. An input signal 201, which is to be transmitted, may generally be thought of as a baseband representation of a signal to be transmitted. Conventionally input signal 201 is in complex form.

Input signal 201 is provided as an input to magnitude converter 203 and as an input to multiplier 205. Output of magnitude converter 203 is effectively a magnitude or envelope of input signal 201, which output is provided as an input to a plus port of a first adder 207. Another input to adder 207 is a fixed threshold value, T, 209, which may be provided as an input to a minus port of adder 207. If such sum output from adder 207 is a negative value, then a peak in input signal 201 has not exceeded threshold value T. If, however, a peak in input signal 201 has exceeded threshold value T, then output of adder 207 is positive.

A sum output from adder 207 is provided as an input to a second adder 211. Another input to adder 211 is an output from weights adder 213. Output of adder 211 is provided as an input to maximum amplitude block 215. A non-complex output from maximum amplitude block 215 is provided as an input to a delay chain or shift register ("weights block") 217. Taps from weights block 217 are used to provide weights, such as weights w2, w1, w0 to weights adder 213 and weights w2, w1, w0, w1, w2 to weights adder 223. Like output from weights block 217, weights output from weights adder 223 are all magnitude signals. Weights adder 223 further receives a gain of unity ("1") scaling input signal 221. Output from weights adder 223 is provided as a gain scaling input to multiplier 205. Output from multiplier 205 is output signal 225 to be transmitted. Effectively, output signal 225 is a gain scaled version of input signal 201, as described below in additional detail.

If output from adder 207 is negative, then a 1 scaling input signal 221 to weights adder 223 is used as a scaling factor for output from weights adder 223. Accordingly, for this scaled portion of a CFR output signal 225, such portion is the same as an associated portion of input signal 201. If, however, output from adder 207 is positive, then maximum amplitude block 215 provides a non-zero output value for y to weights block 217. Weights adders 213 and 223 receive respective sets of weights distributed in time or spread out in time responsive to such non-zero output value from maximum amplitude block 215. Weights adder 223 may add such weights to provide a gain signal, which effectively is a "less than unity" scaling factor, for input to multiplier 205. Weights adder 213 may add a received set of weights for a feedback input to adder 211. Basically, output of weights adder 213 is provided to indicate how much contribution a prior portion of input signal 201 is contributing to a current scaling factor, such as to account for overlapping peaks for example.

Unfortunately, performance of such a conventional low cost window CFR engine 200 may be too low for some applications. For example, peak-to-amplitude reduction ("PAR") versus error vector magnitude ("EVM") may be too underperforming in such a conventional low cost window CFR engine 200 for some applications. For example, to get a sufficiently wide spectral mask, a gain signal output from weights adder 223 may have to be wider or spread out more, which results in additional spectral loss. Furthermore, such conventional low cost window CFR may use multiple stages, such as to account for regrowth or overlapping signals, which adds to complexity and increases latency.

As described below in additional detail, a cancellation pulse ("CP") windowing system may be provided to improve performance over such a conventional low cost window CFR engine 200 though preserving much of the low cost nature of such a conventional low cost window CFR engine 200. Such cancellation pulse as described below may be done in a single stage, which avoids complexity of multiple stages. However, such a cancellation pulse may use 1 to 3 stages, followed by a conventional windowing CFR stage. Furthermore, by obtaining sufficient performance with a single cancellation stage pulse, spectral performance is not degraded by having multiple cancellation pulses, in addition to avoiding complexity associated with having to use multiple cancellation pulses. Additionally, sufficient performance may be obtained in a single stage, which reduces latency in contrast to multiple stage systems. Furthermore, a quadratic fit of the envelope waveform to identify peaks may be obtained, as well as fractional offset from a peak, to improve performance for samples not exactly at the peak. Moreover, peak prediction may be added as described below to improve performance. If an envelope is approximated as a quadratic polynomial over a 3 sample interval as:

$$y(n+d)=y(n)+d*dy(n)+d2*ddy(n),$$

where d is a fractional offset from a central sample y(n), then:

$$y(n+1)=y(n)+dy(n)+ddy(n), \text{ and}$$

$$y(n-1)=y(n)-dy(n)+ddy(n).$$

Thus, dy(n) and ddy(n) to fit the observed waveform associated therewith may be determined, and then:

$$dy(n)=(y(n-1)-y(n-1))/2, \text{ and}$$

$$ddy(n)=(y(n)-y(n-1)/2-y(n-1)/2)$$

may each be determined. By differentiating y(n+d) by d, a peak of such waveform may be found as described in additional detail below. By equating such differentiated result to zero, a peak offset location d may be found, and then this value of d may be substitute into the differentiated equation to obtain the peak value.

The use of interpolation as described elsewhere herein increases the accuracy of locating such peak as if it was significantly oversampled. By computing or otherwise determining peak values at a lower sampling rate, significant reductions in time and effort (e.g., "compute rate") for determination of such locations may be obtained.

After the amplitude and location of a signal is identified as described elsewhere herein, the phase of a peak may be found to generate the correct CP gain therefor. This may be done in any of multiple ways as described elsewhere herein.

Additionally, a signal may have a quadratic fit performed in the complex domain, and a corresponding quadratic interpolation can be used with an offset d obtained to generate a complex amplitude at the peak location determined. Alternatively or optionally, the magnitude of a peak can be used, and the nearest sample phase may be used to obtain a composite complex CP gain.

While the following description may be in terms of an FPGA for purposes of clarity by way of example and not limitation, the description herein is not limited to FPGAs. Rather, any integrated circuit, whether an ASIC, an ASSP, FPGA, or any other integrated circuit, may be used.

A single-stage recursive cancellation pulse may be used for CFR, namely a single-stage recursive cancellation pulse-CFR ("CPCFR") engine. Along those lines, filtering may be used with a cascaded integrator-comb-like ("CIC-like") filter structure for one or more carrier configurations followed by a "clean-up" stage. A "clean-up" stage may use a conventional window CFR with a small reduction in performance, generally on the order of less than a one decibel reduction.

Figure 3:
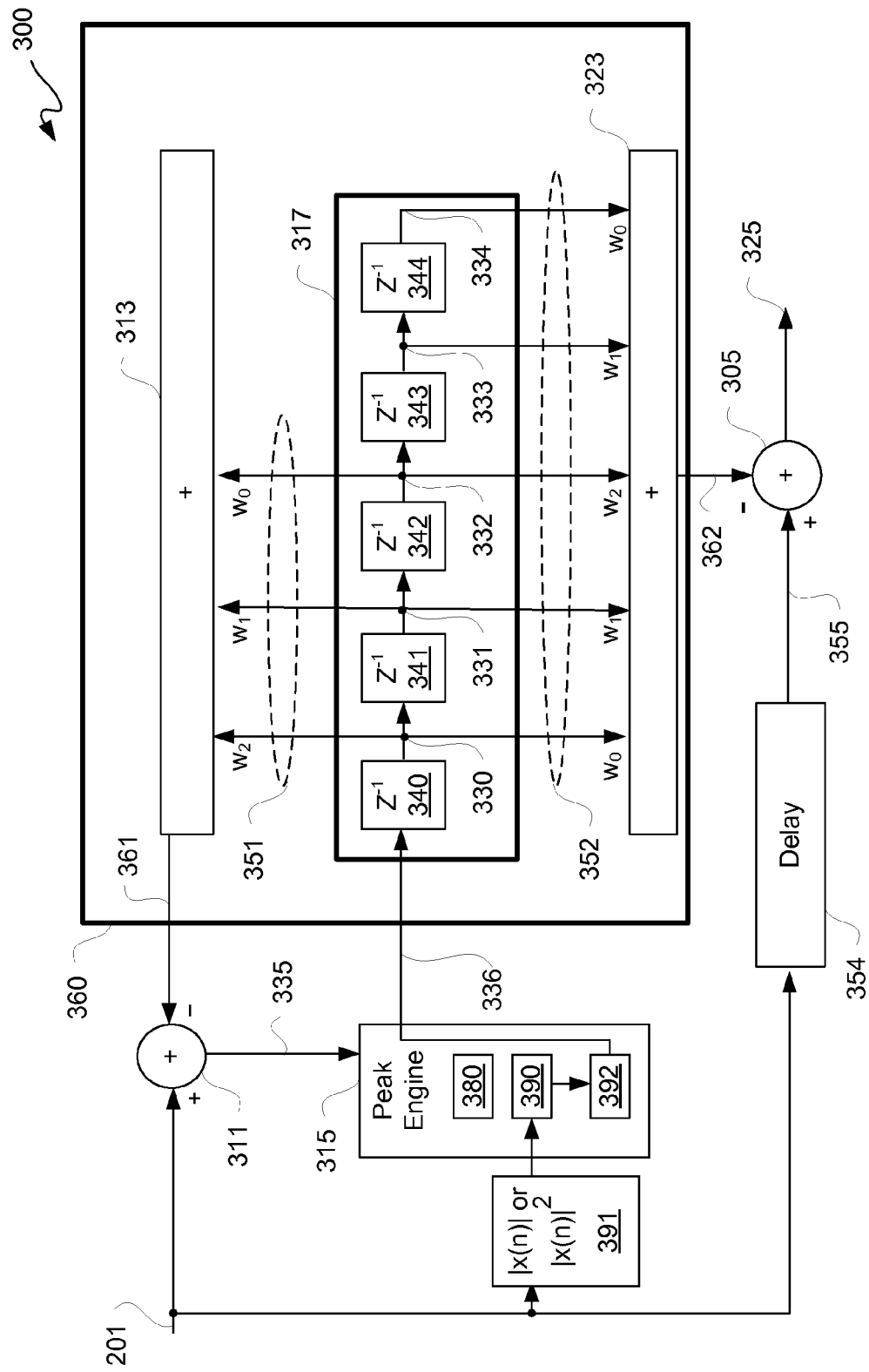
FIG. 3 is a block diagram depicting an exemplary CPCFR engine.

FIG. 3 is a block diagram depicting an exemplary CPCFR engine 300. CPCFR engine 300 may be used in base stations or other systems having a transmitter to reduce clipping in a power amplifier and/or to increase efficiency of a power amplifier while reducing overall distortions introduced (e.g., ACLR, EVM). Furthermore, CPCFR engine 300 may be used to reduce the amount of RF power provided to an antenna for transmission. Peak-to-average ratio ("PAR") can be very high (e.g., 12 dB or more) in multiband and multi carrier systems. CPCFR engine 300 may be used to substantially reduce PAR, such as in a range of approximately 5 to 8 dB.

CPCFR engine 300, or of other examples of CPCFR engines as described hereinbelow, may be implemented in one or more ICs, including without limitation one or more digital signal processors, ASICs, ASSPs, and/or FPGAs. For example, for an FPGA implementation, a peak engine 315 or other components of a CPCFR engine, such as described herein for example, may be implemented using DSP blocks or slices 106 of FPGA 100 of FIG. 1. However, other types of multiplier and/or adder programmable hard macros of an FPGA, a digital signal processor, an ASIC, or an ASSP, or other type of IC, may be used in yet other implementations. An advantage of an FPGA implementation of CPCFR engine 300 is that it can be reconfigured for a radio architecture and system parameters thereof, generally in contrast to ASICs and ASSPs., among other more static or non-reconfigurable implementations. Along those lines, an FPGA implementation may be tailored to accommodate different band layouts and/or multi-radio access technologies ("multi-RATs"). An example of a multi-RAT is a base station that supports WCDMA, LTE5, LTE10, LTE20, EDGE, GSM, CDMA2000, and FH GSM. Other CFR technologies, such as insertion of data into unused user channels and unused tones in OFDM, among other technologies for implied RAT, can be employed ahead of the CFR block described to improve the overall system performance ahead of CPCFR engine 300, such as for PAR reduction applicable to multi-standard and/or multi-band systems, and which may be independent of transmitter modulation format, other than parameters that can be used to configure CFR operation for a configuration.

With continuing reference to FIG. 3, CPCFR engine 300 includes a finite impulse response filter 360 configured to provide a cancellation pulse 361 and a cancellation pulse 362. CPCFR engine 300 may further include adders 311 and 305, a peak engine 315, and a delay 354.

Adder 311 is coupled to receive an input signal 201 and a cancellation pulse 361 to provide a difference signal 335. Along those lines, input signal 201 may be provided to a plus port of adder 311, and cancellation pulse 361 may be provided to a minus port of adder 311. Optionally, adder 311 may be thought of as a subtractor.

A peak engine 315 may be coupled to receive difference signal 335. Peak engine 315 may be configured to provide a cancellation pulse value 336 responsive to a difference signal 335. Peak engine 315 may effectively provide a cancellation pulse value 336 that is unity if difference signal 335 is negative or zero, namely input signal 201 is less than or equal to a threshold value, T. If, however, difference signal 335 is greater than zero, peak engine 315 may provide a cancellation pulse value 336 to adjust a complex cancellation pulse 362 responsive to weighting. Cancellation pulse 362 is not merely a magnitude, but rather is a pulse waveform that is provided responsive to a cancellation pulse ("CP") value or gain 362. Cancellation pulse 361 is associated with a past or prior cancellation pulse contribution, and cancellation pulse value 336 may be recursively updated responsive to such past cancellation pulse contribution for a currently processed input signal 201. Thus, updated instances of each of cancellation pulses 361 and 362 may be provided.

Finite impulse response ("FIR") filter 360 may be coupled to receive cancellation pulse value 336 to a delay line 317 thereof to provide cancellation pulse 361 and cancellation pulse 362, as described below in additional detail. Delay line 317 may be composed of a plurality of delays, such as register delays 340 through 344, coupled in series with respective taps between such delays, such as taps 330 through 333, and with a final tap 334. Even though five delays are illustratively depicted fewer or more than five delays may be used.

Delay line 317 may be coupled between amplification-summation blocks 313 and 323 of FIR filter 360. From a portion of such taps of delay line 317, a set of weights 351 may be provided to an amplification-summation block 313 of FIR filter 360, and from another portion of such taps of delay line 317, another set of weights 352 may be provided to another amplification-summation block 323 of FIR filter 360. In this example, taps 330 through 332 are respectively coupled to amplification-summation block 313 to respectively provide weights w2 through w0 forming the set of weights 351, and taps 330 through 334 are respectively coupled to amplification-summation block 323 to respectively provide weights w2 through w0 through w2 forming set of weights 352. However, in other implementations, other sets of taps may be used. Furthermore, FIR filter 360 may have any of a variety of configurations, including without limitation factored filters to reduce complexity. An example of such a factored filter includes a cascaded integrator-comb ("CIC") filter; however, other FIR reduced hardware implementations may be used.

A delay 354 may be coupled to receive input signal 201 to provide a delayed input signal 355. Effectively, delay 354 may be thought of as a cancellation pulse delay, namely a delay used in order to have a cancellation pulse 362 generated for a current input signal 201 to arrive within a same window of time at adder 305 as delayed input signal 355 for such current input signal 201. Cancellation pulse 362 may be provided to a minus port of adder 305, and delayed input signal 355 may be provided to a plus port of adder 305. Output of adder 305 is a difference signal 325, which is a crest factor reduced version of such delayed input signal 355.

Peak engine 315 may be configured with a threshold peak value T. For example, if an input signal 201 x(n) and a cancellation pulse 361 c(n) produce a difference signal 335 y(n), namely y(n)=x(n)−c(n), operation of peak engine 315 may be mathematically expressed as:

$$y(n) = \begin{cases} 1 & |x(n)| \le T \\ \dfrac{T}{|x(n)|} & |x(n)| > T \end{cases}$$

where T is a threshold peak value. Thus, for input signal x(n) having no peaks greater than T, cancellation pulse value 336 output from peak engine 315 is equal to 1, and for input signal x(n) having a peak greater than T, cancellation pulse value 336 output from peak engine 315 is a magnitude of T divided by an absolute value of the amplitude of x(n).

Because CPCFR engine 300 is configured for recursive or feedback operation by generation of a past cancellation pulse contribution, which may include one or more past applications of cancellation pulses, and subtraction of such past cancellation pulse contribution from a current input signal 201, difference signal 355 effectively indicates how much cancellation for a current sample, if any, is to be applied based on contribution of such one or more past cancellation pulses. For example, for a signal carrier with an oversampling rate of two, a cancellation pulse may be 24 or fewer samples.

Optionally, peak engine 315 may further be configured to "look-ahead" for one or more future contributions to improve performance of CPCFR engine 300. In a look-ahead, if a next sample of input signal 201 is over threshold T, then two samples in combination may be examined to find the effect of interaction in cancellation pulses generated. Such samples may be highly correlated, and a cancellation pulse 361 may likewise be correlated. To simplify peak processing by peak engine 315, it may be assumed that signal phase is constant over an interval being considered so that only magnitude data may be processed. A current peak may be affected by one or more future pulse cancellation pulses. For this reason, a look-ahead in determination by peak engine 315 of pulse amplitude for a currently sampled input signal 201 may be useful to improve performance.

If a current sample is over a threshold T and if a next sample is also over threshold T, then this state of events may affect amplitude of such current sample and introduce an error relative to a target threshold, which may overly reduce amplitude of a current sample of an input signal, namely over cancellation. A look-ahead block 380 in peak engine 315 may be used to reduce such error. Along those lines, about 1 dB of EVM may be recovered without compromising a PAR target. For purposes of clarity by way of example and not limitation, only a single sample of look-ahead is considered below for CFR to improve performance. However, in other implementations, more than one sample of look-ahead may be used.

Additionally, for purposes of clarity and not limitation, it is assumed that future samples over a threshold are of the same phase as the current sample so that only the magnitude of such samples may be considered in determining magnitude of a cancellation pulse for a current sample. Past and future decisions can affect the desired peak cancellation used, as the CPs therefor may overlap. In addition to cancelling a signal to be below a threshold, the amount of energy injected with one or more cancellation pulses may be reduced or minimized.

A signal with past CP contribution at time n from a k sample look-ahead may be defined as y_e(n,k). For this example, a look-ahead of 1 to 2 samples provided was sufficient. If y_e(n,1)>threshold T, then cancellation may be applied. This cancellation may be provided from a future CP provided, however, such future CP is sufficiently large compared to the current y_e(n,0). A current CP magnitude may be determined using predicted CP magnitudes. If a future CP was ignored, the current CP value may be mathematically expressed as:

$$c(n)=|y\_e(n,0)|-Ty\_e(n,0)/|y\_e(n,0)|$$

Without taking into consideration any future sample, a current cancellation pulse c(n) may have a magnitude of the current sample minus the CP contribution of past samples over threshold T with phase rotated to match an associated input sample's phase. If one or more future samples are considered, cancellation pulse gains c(n:n+L−1) may be determined, where L is a look-ahead value. Along those lines, a c(n:n+L−1) vector may be found that satisfies:

$$\text{Minimize } c(n:n+L-1)^T c(n:n+L-1),$$

Subject to:

$$|y(n+0)|=|y\_e(n,0)-w(M:M+L-1)^T c(n:n+L-1)|<=T$$

$$|y(n+1)|=|y\_e(n,1)-w(M-1:M+L-2)^T c(n:n+L-1)|<=T$$

$$\vdots$$

$$|y(n+L-1)|=|y\_e(n,L-0)-w(M-L:M)^T c(n:n+L-1)|<=T$$

In other words, a current predicted signal minus contribution of a past c(n) may be determined, and contributions of a future c(n) may be subtracted using a filter function w of length 2M−1 whose output is used to generate difference signal 335, for M a positive integer greater than zero. A minimum, or at least substantially reduced, energy c(n:n+L−1) may be found sufficient to drive all of selected sample magnitudes to a value below T. This may be mathematically expressed as:

$$\text{Minimize } c(n:n+L-1)^T c(n:n+L-1),$$

Subject to:

$$|y_{e(n,0)}|^2 - T^2 - 2Re(w(M:M+L-1)^T c + c^T w(M:M+L-1)w(M:M+L-1)^T c <= 0$$

$$\vdots$$

The above equations are quadratically constrained quadratic programming ("QCQP") equations. Accordingly, look-ahead block 380 may be implemented using quadratic programming. Moreover, look-ahead block 380 may be implemented using look-up tables, among other ways of generating a nonlinear programming function. However, as described below in additional detail, such look-ahead block 380 may be simplified so as to be implemented using linear programming, which may include one or more further simplifications thereof.

For purposes of clarity, such set of equations may be simplified to only consider the current sample and the next sample. This may be done with a series of enumerated conditions. To simplify the processing of such equations, it may be assumed that w(M)==1>w(M+1:end). Assuming the phases of such samples are equal on y_e(n,k) values, then c vector becomes real valued. This assumption reduces determination to a more of a linear problem, as follows:

$$\text{Minimize } c(n:n+L-1)^T c(n:n+L-1),$$

Subject to:

$$|y\_e(n,0)|-T-w(M:M+L-1)^T c(n:n+L-1) \le 0$$

$$|y\_e(n,1)|-T-w(M-1:M+L-2)^T c(n:n+L-1) \le 0$$

$$\vdots$$

Minimize $x^T x$,

Subject to:

$$Ax \le b; x \ge 0$$

$$A=-\text{Toeplitz}(w); b=\text{abs}(y_e)-\text{Threshold}$$

These more linear equations may be further manipulated using Karush-Kuhn-Tucker ("KKT") conditions, namely:

$$x+A^T \mu^T -y=0$$

$$Ax+v=b$$

$$x \ge 0, \mu \ge 0, y \ge 0, v \ge 0, yx+0, \mu v=0$$

where slack variables u, y, and v are introduced.

The use of KKT conditions reduces determination to a linear programming problem. Such linear programming problem may be simplified by assuming that phase is constant over an interval of interest, which leads to a real valued optimization. The c values may then be phase rotated using the current sample phase to match the input signal at the current sample point. This may be mathematically expressed as:

$$\text{Minimize } c(n:n+L-1)^T c(n:n+L-1),$$

Subject to:

$$|y\_e(n,0)|-T-w(M:M+L-1)^T c(n:n+L-1) \le 0$$

$$|y\_e(n,1)|-T-w(M-1:M+L-2)^T c(n:n+l-1) \le 0$$

The above may be further simplified by minimizing the sum of real valued CP amplitudes rather than the sum squared.

Accordingly, look-ahead block 380 may be a linear programming function that uses real valued data. Along those lines, using a single sample look-ahead, a single pass CFR by CPCFR engine 300 with look-ahead block 380 may have a linear PAR versus EVM slope that approximates an ideal slope therefor with less separation between such two lines than CPCFR engine 300 without look-ahead block 380, namely improved performance. However, performance provided by quadratic or even by linear programming may not be needed in all applications, and according optionally an even less complex look-ahead block 380 may be used.

Look-ahead block 380 may be configured to look at future samples and quantize those samples that are above or over a threshold T, and then look back with these quantized future samples and apply them to the current sample to eliminate most of the future and past contributions in selecting a current CP complex gain 336. To address the values of input signal 201 between sample points, the current peak may be located in terms of fractional delay, and a CP may be generated with the same fractional offset from the current sample. A CP table that is sample interpolated may be used for such fractional offset. Estimating a fractional sample and CP interpolation is described below in additional detail.

When a signal is interpolated, peaks that exceed a threshold may arise between sample points. As described below in additional detail, interpolated data may be adjusted such that it lies below a threshold T without using an excessive CP. Along those lines, sampled point amplitudes may be adjusted and these adjusted sample point amplitudes may be used to determine CP gains. Conventional amplification-summation blocks 313 and 323, which for example may include a shift register, may not be able to provide fractional offsets.

Figure 4:
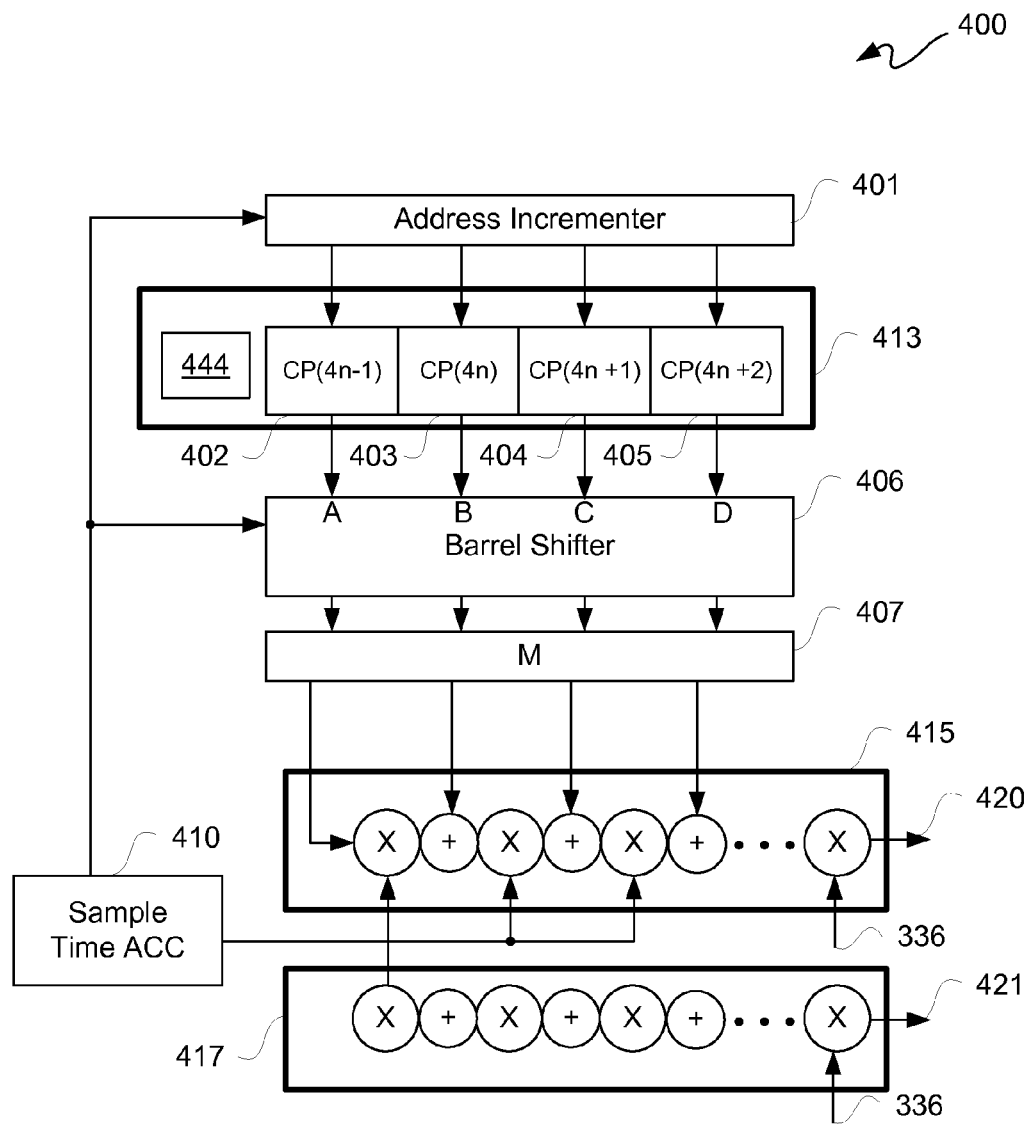
FIG. 4 is a block diagram depicting an exemplary cancellation pulse generator ("CPG").

FIG. 4 is a block diagram depicting an exemplary CP generator ("CPG") 400. A CPG 400 may be used instead of an amplification-summation block or may be used in addition to an amplification-summation block, as described below in additional detail. CPG 400 may be used with fractional offsets, namely to adjust for a non-integer difference between where a sampling point is offset from an actual peak. CPG 400, or another configuration thereof, may be implemented in one or more ICs, including without limitation one or more digital signal processors, ASICs, ASSPs, and/or FPGAs. For example, for an FPGA implementation, an adder-multiplier chaine, such as described herein for example, may be implemented using DSP blocks or slices 106 of FPGA 100 of FIG. 1. However, other types of multiplier and/or adder programmable hard macros of an FPGA, a digital signal processor, an ASIC, or an ASSP, or other type of IC, may be used in yet other implementations.

For purposes of clarity and not limitation, assume a signal x(n) is white sequence filtered with a filter h(t) that is a continuous function, and assume a CP waveform is h(t) evaluated at integer time locations. Peak engine 315 may be configured to reliably and accurately detect peaks and determine peak locations and amplitudes in order to provide a cancellation pulse value or CP complex gain 336.

Figure 5:
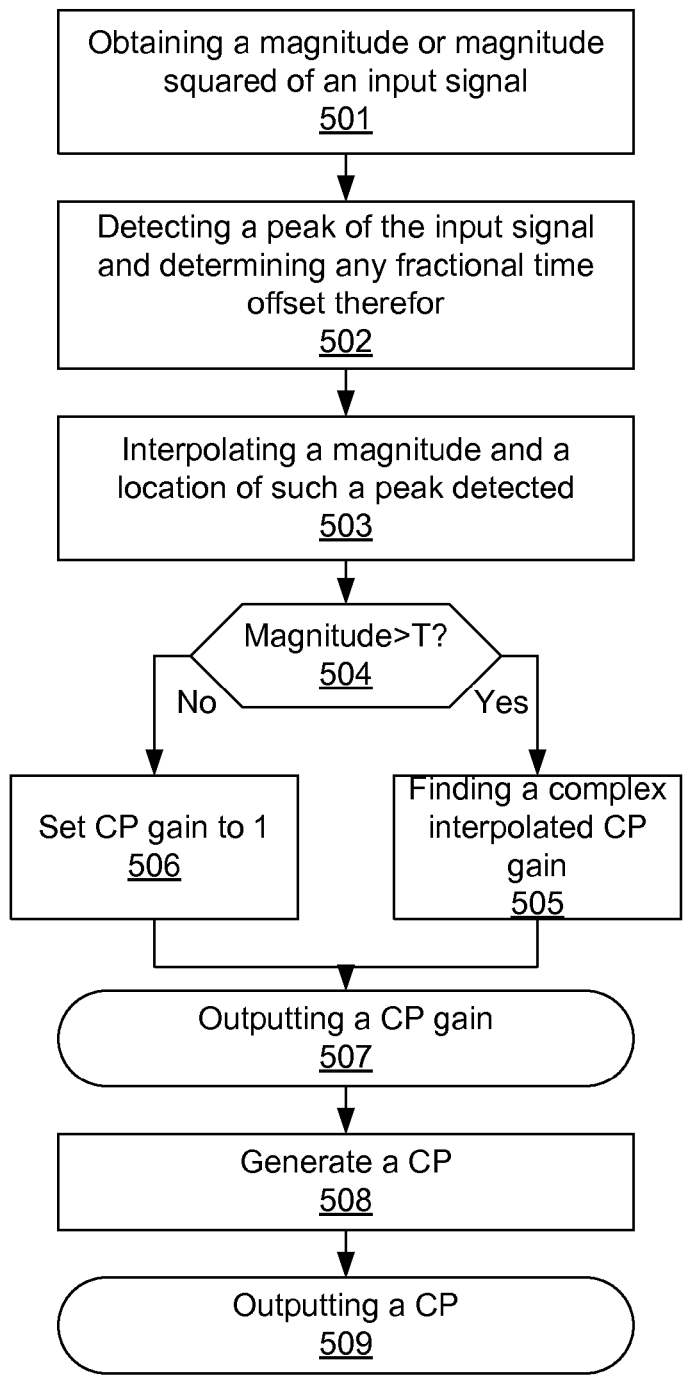
FIG. 5 is a flow diagram depicting an exemplary complex CP gain generation and CP generation flow.

FIG. 5 is a flow diagram depicting an exemplary complex CP gain generation and CP generation flow 500. With simultaneous reference to FIGS. 3 through 5, CPG 400 and CP gain generation flow 500 are further described.

CPCFR engine 300 may be clocked at a sampling rate larger than bandwidth of input signal 201 to identify all of the peaks and their amplitudes correctly compared to an analog counterpart, where effectively the signal is highly oversampled. To cancel all peaks in excess of a threshold value T that occur in an analog domain with a CP, a peak level around a sampled peak may be found for maximum effectiveness at a minimum sample rate. Therefore, these peaks may be found as though a much higher sampling rate was used. In CPCFR engine 300, a complex gain may be found more accurately at the location of a "true" peak in the neighborhood of a sampled peak, and a CP gain may be interpolated to provide a correct CP with a fractional time offset.

In this example, an error in hardware that induces less than a 1% amplitude error is used, indicating that the error induces about −40 dB EVM with respect to the total EVM degradation from CFR processing due to measurement errors. However, other induced hardware error tolerances may be used in other implementations. For purposes of clarity by way of example and not limitation, it shall be assumed that input signal 201 is both Gaussian and has been band limited using an ideal low-pass filter ("LPF") (i.e., the impulse response is the sinc function). The autocorrelation of such a signal is therefore also the sinc function. For purposes of clarity by way of example and not limitation, such sinc (sinc(x)=sin(pi*x)/(pi*x)) function is equal to 0.99 at a time offset of 0.0781 to meet a system budget of a 1% amplitude error. Along those lines, time accuracy may then be <0.08/BW or a normalized fraction of less than 1/12 of the Nyquist sample rate.

At 501, magnitude of an input signal 201 is obtained, and optionally such obtained magnitude may be squared, by magnitude block 391 coupled to receive input signal 201. A magnitude or magnitude squared value of input signal 201 may be provided from magnitude block 391 to drive a peak detector 390. Detection on a squared magnitude of input signal 201 may be used, so the bandwidth ("BW") is twice that of the original signal. This indicates that peak detection may be performed at or above the Nyquist sampling rate therefor. As magnitude is wider, a higher sampling rate may be used by a peak detector 390 of peak engine 315.

At 502, a peak detector 390 may locate or detect a peak and determine any fractional time offset associated therewith within accuracy parameters of an implementation. Peak detector 390 may be configured to locate a peak value and its fractional time offset using a quadratic fit to a sequence of samples, such as responsive to a sampling clock signal (not shown for purpose of clarity).

When a peak has been found as sampled by a peak detector 390, at 503 an interpolated magnitude and an interpolated location of such peak may be found using a quadratic fit process as follows:

```
r=abs(x);
ym=r(peak_loc−1);
y0=r(peak_loc);
yp=r(peak_loc+1);
if y0>ym & y0>yp
a=(2*y0−yp−ym)/2;
b=(yp−ym)/2;
frac=b./a./2;
frac=min(max(frac,−0.5),0.5);
amp=−a*frac.*frac+b.*frac+y0;
if amp>DetThres
    a=(2*x(peak_loc)−x(peak_loc−1)−x(peak_loc+1))/2;
    b=(x(peak_loc+1)−x(peak_loc−1)/2;
    c_amp=−a*frac.*frac+b.*frac+x(peak_loc);
    cp_amp=c_amp*(1−CPThres/amp);
end
end
gain=1;
a=max(a,1/64); % normalize a and b
while a<1/2
a=a+a; b=b+b; gain=gain/2;
end
p=[1.3149 −2.9284 2.1225];
ai=polyval(a,p); % inverse approx, ai~=1/a
frac=ai.*b;
frac=min(max(frac,−0.5),0.5); % clip range to acceptable limits
amp=−a*frac.*frac*gain+b.*frac*gain+y0;
det_peak=amp>thres & y0>ym & y0>yp;
```

To avoid division in such quadratic fit process, an inverse is approximated using a 2 or 3 term Taylor series. The values of variable a are normalized to a range of ½ and 1, and the same scale factor is applied to values of variable b. A relative error is <1% as previously indicated, namely a root-mean-square ("rms") error of approximately 1% may be obtained.

A quadratic fit with a second order Farrow filter, higher order differentiators, a Newton search with Farrow inputs, or a spline interpolation with a Newton search may be used, but each of these may be too complex for some applications.

Along those lines, a less complex quadratic interpolation for data over sampled by 2 may be used with a quadratic Farrow filter or differentiators using 5 samples or more. Such interpolation at 503 may be built into peak detector 390.

Oversampling need not be applied to a cancellation pulse as this is a linear function, but such CP gain 336 may be obtained using a fractional sample input for its computation. A cancellation pulse can be at any oversampling rate over the full bandwidth of an original signal. Along those lines, such signal may be oversampled by at least 3 to avoid significant aliasing distortion using peak interpolation. However, quadratic interpolation on signal magnitude squared may be sufficient using a signal interpolated by 2 to satisfy the Nyquist BW, and therefore avoid aliasing distortion which might reduce peak measurement accuracy.

If a peak detected by peak detector 390 has an interpolated magnitude greater than a threshold T as determined at 504, then at 505 a complex interpolated CP value, such as for CP value 336, may be found by interpolator 392 of peak engine 315. For example, a complex amplitude may be found to be sufficient for such complex interpolated CP value 336 using the phase of a nearest sample to such detected peak location. For example, filter coefficients for a Farrow filter may be generated by placing knots half way between sample points and, using a quadratic fit through a sampled peak, or by placing knots on either side of such quadratic fit sampled peak. Knot values may be found using a cubic spline through a nearest set of 4 samples. However, other knot locations may be used, and other determinations of knot values may be used. Continuing the example of selecting the nearest peak using a 4× oversampled signal, an improvement, such as approximately 9 dB, in the performance in amplitude accuracy at 2 times oversampling may be obtained. Additionally, an improvement, such as approximately 3 dB, in peak location accuracy may be obtained. This is just one example of a complex interpolation, and other ways of performing a complex interpolation may be used. For a complex amplitude of such original signal at a peak so estimated by interpolation in order to determine a CP gain, at 505, a fractional offset value for such complex amplitude may be included in such complex interpolation by interpolator 392 using either complex data or such phase of a nearest sample, as magnitude has been obtained by interpolation at this point.

If, however, interpolated magnitude does not exceed threshold T, then at 506 CP gain is set to equal 1. At 507, a CP gain may be output as being either from 505 or 506 depending on whether interpolated magnitude exceed threshold T or not, as previously described. At 508, a CP may be generated using such CP gain obtained at 507. Such CP may be generated by CPG 400. At 509, a CP, such as a complex CP, may be output.

Accordingly, interpolated peak detection and complex CP gain generation have been described. CFR performance may be adequate with a single pass through CPCFR 300 for meeting PAR versus EVM targets, which single pass significantly reduces latency and complexity compared to conventional multi-pass CFR. Such single pass may include use of a CPG 400. However, multiple CPGs 400 may be cascaded to provide better performance though with increased latency and reduced complexity for some implementations.

Having determined fractional time offset d and complex CP gain as described above, a CP may be determined or generated at 508. For purposes of clarity by way of example and not limitation, it shall be assumed that fractional time offset accuracy involves <0.08 sample accuracy or about 4 bits of resolution. Quadratic interpolation may be used with an associated polynomial stored in CP memory 413. Optionally, it may be more efficient to use interpolant data directly from sample time data to avoid approximately a three to four multiplier increase in memory to be used for storage. An interpolation function may be described as:

$$y(t) = \begin{bmatrix} t^3 & t^2 & t & 1 \end{bmatrix} \begin{bmatrix} c_{0,0} & c_{0,1} & c_{0,2} & c_{0,3} \\ c_{1,0} & c_{1,1} & c_{1,2} & c_{1,3} \\ c_{2,0} & c_{2,1} & c_{2,2} & c_{2,3} \\ c_{3,0} & c_{3,1} & c_{3,2} & c_{3,3} \end{bmatrix} \begin{bmatrix} P_{-1} \\ P_0 \\ P_1 \\ P_2 \end{bmatrix} = TMP$$

$$0 \leq t \leq 1$$

where $p_i$ is a known point near a target point, $y(t)$ in an interpolant between $p_0$ and $p_1$ with t being a target offset. More generally quadratic, cubic or other interpolation method can be used but these interpolation types can in general be expressed as:

$$y(t) = T*C*P, \text{ where}$$

$$T = [t^\hat{}k \; t^\hat{}(k-1) \ldots 1].$$

C is a real valued matrix of size k×m, and P=[p(n−1) p(n) p(n+1)...p(n+m)]. In this example the largest degree K is 3 and the history size m is 2.

CPG 400 includes a sample time accumulator ("ACC") 410, an address incrementer or sequencer 401, a CP memory bank or CP memory 413, a barrel shifter 406, an interpolation matrix M 407, and multiplier-adder chains 415 and 417. Multiplier-adder chains 415 and 417 using Horners method effective may be used to replace more direct polynomial evaluation for reduced computation. an polynomial. From description of a CPG 400 for replacement of an amplification-summation block 323, it shall be understood how another CPG 400 may be configured to replace amplification-summation block 313.

Weights of set of weights 352 may be respectively provided to multipliers of multiplier-adder chains 415 and 417. Complex CP value 336 may be provided to a final multiplier in each of multiplier-adder chains 415 and 417. Output from multiplier-adder chain 415 may be an even CP output 420, and output from multiplier-adder chain 417 may be an odd CP output 421. CP outputs 420 and 421 may be alternatively provided to adder 305 via an analog summer.

Sample times may be provided from sample time accumulator ACC 410 to address incrementer 401 and barrel shifter 406, as well as multipliers of multiplier-adder chain 415. Address incrementer 401 may provide respective addresses to memory blocks 402 through 405 of CP memory bank 413. Continuing the above example of 4× oversampling, a CP is oversampled 2× at four nearest neighbors, namely (4n−1), (4n), (4n+1), (4n+2). Polynomial 444 for quadratic interpolation, such as an interpolation function y(t) as previously described, may be stored in such CP memory 413 for use with each of memory blocks 402 through 405. Optionally, interpolant data 444 directly from sample time data may be stored in CP memory 413 for use with each of memory blocks 402 through 405 instead of a polynomial.

For some signals, CP memory 413 can be for 16-32 samples, and, by exploiting symmetry with addressing, total length can be approximately 8-16 samples. Along those lines, each CP memory bank 413 may be for holding only 4 real values, for a widest band signal considered being for LTE20. With an oversampling rate ("OSR") of 2, a signal sample rate may be approximately 40 mega samples per second ("Msps"). If a block of CPGs 400 can operate at 320 MHz, then one such block could have 8 CPGs to at least approximate per stream processing.

Outputs from quadratic interpolation or interpolant data from memory blocks 402 through 405 for each of such oversampled nearest neighbor samples may be provided to barrel shifter 406. Barrel shifter 406 effective barrel shifts order of bits output from memory blocks 402 through 405, which are respectively indicated as outputs A through D. For example, barrel shifter 406 can cycle the order of bits ABCD as DABC, CDAB, BCDA, etc, for input to interpolation matrix M 407. Outputs of interpolation matrix M 407 may be respectively provided to multipliers of multiplier-adder chain 415.

For interpolation matrix M 407, a matrix M can be selected responsive to properties to be used, as may vary from application-to-application. For purposes of clarity by way of example and not limitation, matrix M, which in the example below is the Catmull-Rom spline matrix, may be used.

$$M = \begin{bmatrix} -1 & 3 & -3 & 1 \\ 2 & -5 & 4 & -1 \\ -1 & 0 & 1 & 0 \\ 0 & 2 & 0 & 0 \end{bmatrix} / 2$$

In this instance, all of the entries in matrix M are integers as in many spline matrices M. These entries are simple, so the required multiplications can be simple shift and/or add operation for reduced complexity in implementing matrix M. A product with a T vector may be obtained using Horner's method or rule using three multiplications per output point. By using interpolation as described above, a CP sample rate can be completely decoupled from a signal sample rate. Along those lines, CP length can be significantly reduced in some applications.

A Catmull-Rom spline may not provide a sufficient response near a Nyquist frequency. Accordingly, a Farrow filter approach may improve performance by providing a better M matrix rather than expanding the size of such matrix. Matrix M may be determined using singular value decomposition ("SVD") techniques to approximate a prototype filter. Moreover, other types of splines for smoothly interpolating between points or samples may be used. For purposes of clarity by way of example and not limitation, a radio access technology ("RAT") example is provided. Such a single block may provide all of CPG resources used for each CFR stage for a plurality of RATs. For an oversampling rate ("OSR") of 2× a signal BW, the increment on words may be ½ or less of CP spacing, so such a block may operate at ½ of an output rate, except for a Horner output and a complex gain rate output, to further enhance hardware efficiency.

Even though the above description is generally in terms of RAT, the above description equally applies to a single transmission specification or standard. Furthermore, the above description is generally in terms of CFR for a single carrier signal, where peak detection may have adequate accuracy using a signal that is oversampled by approximately 2× its signal bandwidth, and where pulse cancellation can occur at a lower rate than such OSR but may be more easily done at the same rate as such OSR. A cancellation pulse may be interpolated to match a peak located with a targeted complex gain applied to reduce or minimize distortion.

Figure 6:
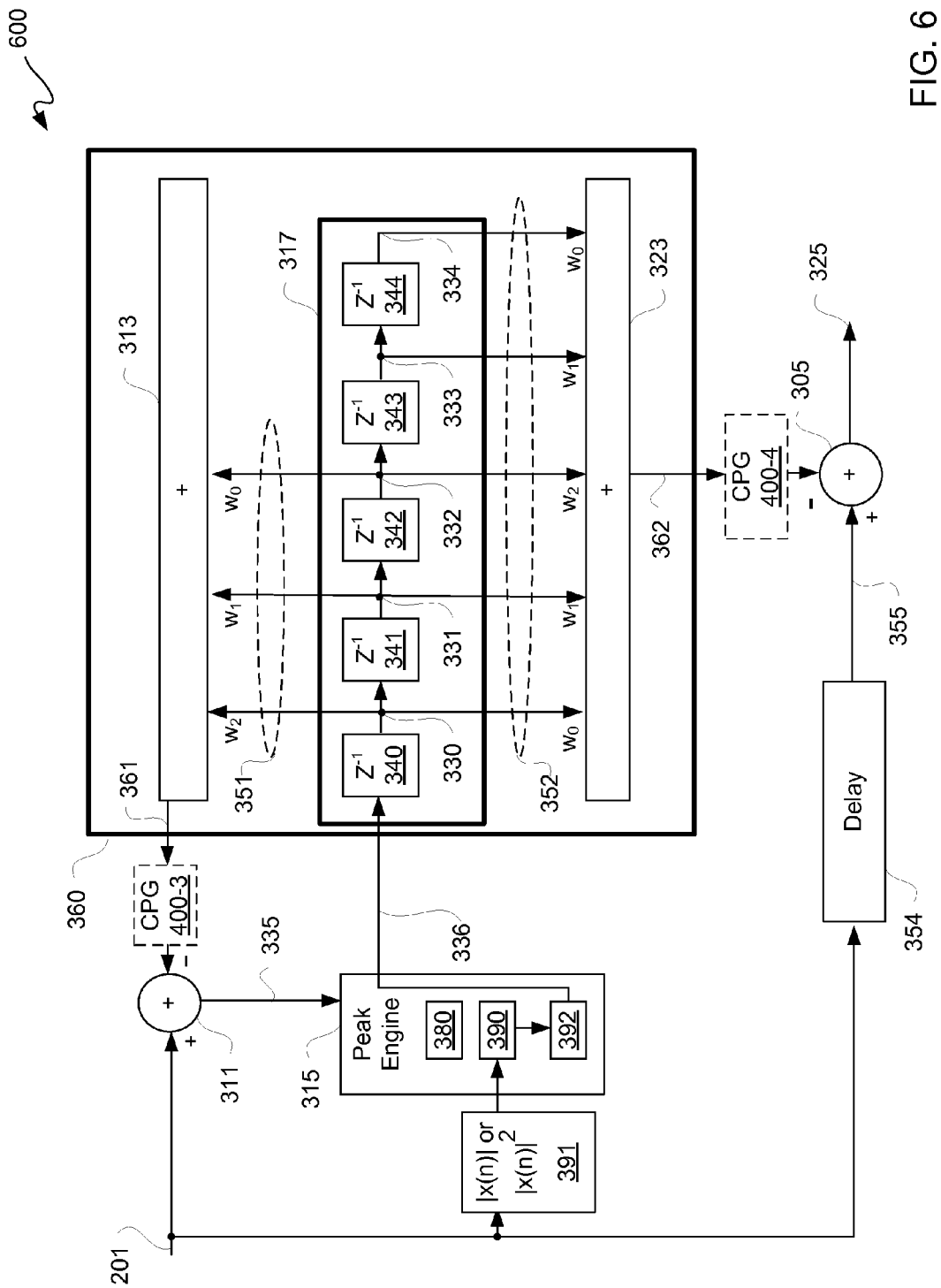
FIGS. 6 through 8 are respective block diagrams depicting other respective exemplary cancellation pulse crest factor reduction ("CPCFR") engines.

FIG. 6 is a block diagram depicting another exemplary CPCFR engine 600. CPCFR engine 600 is the same as CPCFR engine 300 of FIG. 3 with the following differences. In CPCFR engine 600, optional clean-up CPGs 400-3 and 400-4, such as versions of CPG 400 of FIG. 4 have been added as clean-up stages. CPG 400-3 is coupled between amplification-summation block 313 and adder 311 to clean-up cancellation pulse 361 for input to adder 311, and CPG 400-4 is coupled between amplification-summation block 323 and adder 305 to clean-up cancellation pulse 362 for input to adder 305.

Figure 7:
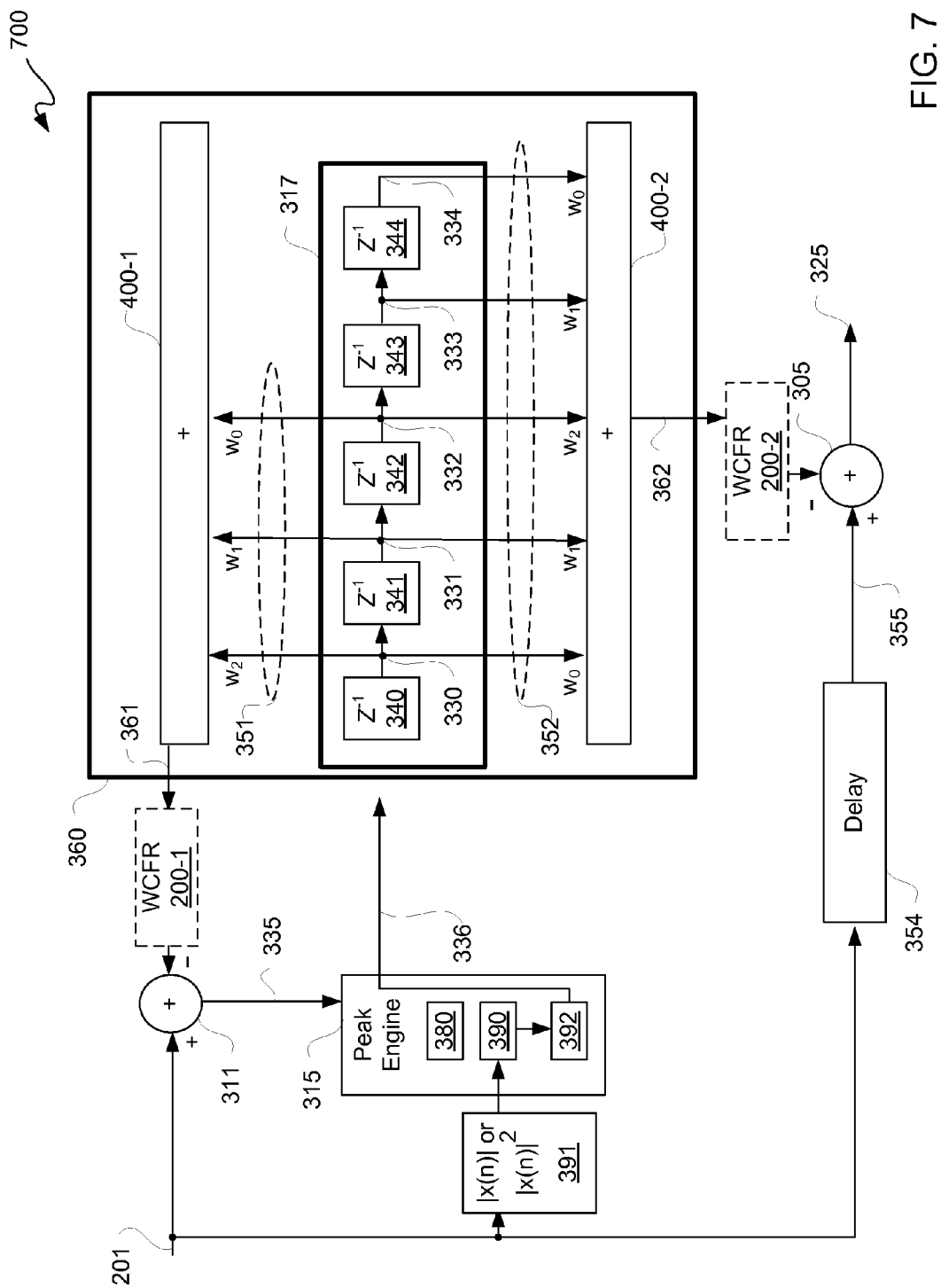

FIG. 7 is a block diagram depicting another exemplary CPCFR engine 700. CPCFR engine 700 is the same as CPCFR engine 300 of FIG. 3 with the following differences. In CPCFR engine 700, amplification-summation blocks 313 and 323 have been respectively replaced with CPGs 400-1 and 400-2. Furthermore, optional clean-up window-CFR ("WCFR") engines 200-1 and 200-2, such as of FIG. 2, have been added as clean-up stages. WCFR engine 200-1 is coupled between CPG 400-1 and adder 311 to clean-up cancellation pulse 361 for input to adder 311, and WCFR engine 200-2 is coupled between CPG 400-2 and adder 305 to clean-up cancellation pulse 362 for input to adder 305. Cancellation pulses 361 and 362 may respectively replace input signal 201 in FIG. 2.

Figure 8:
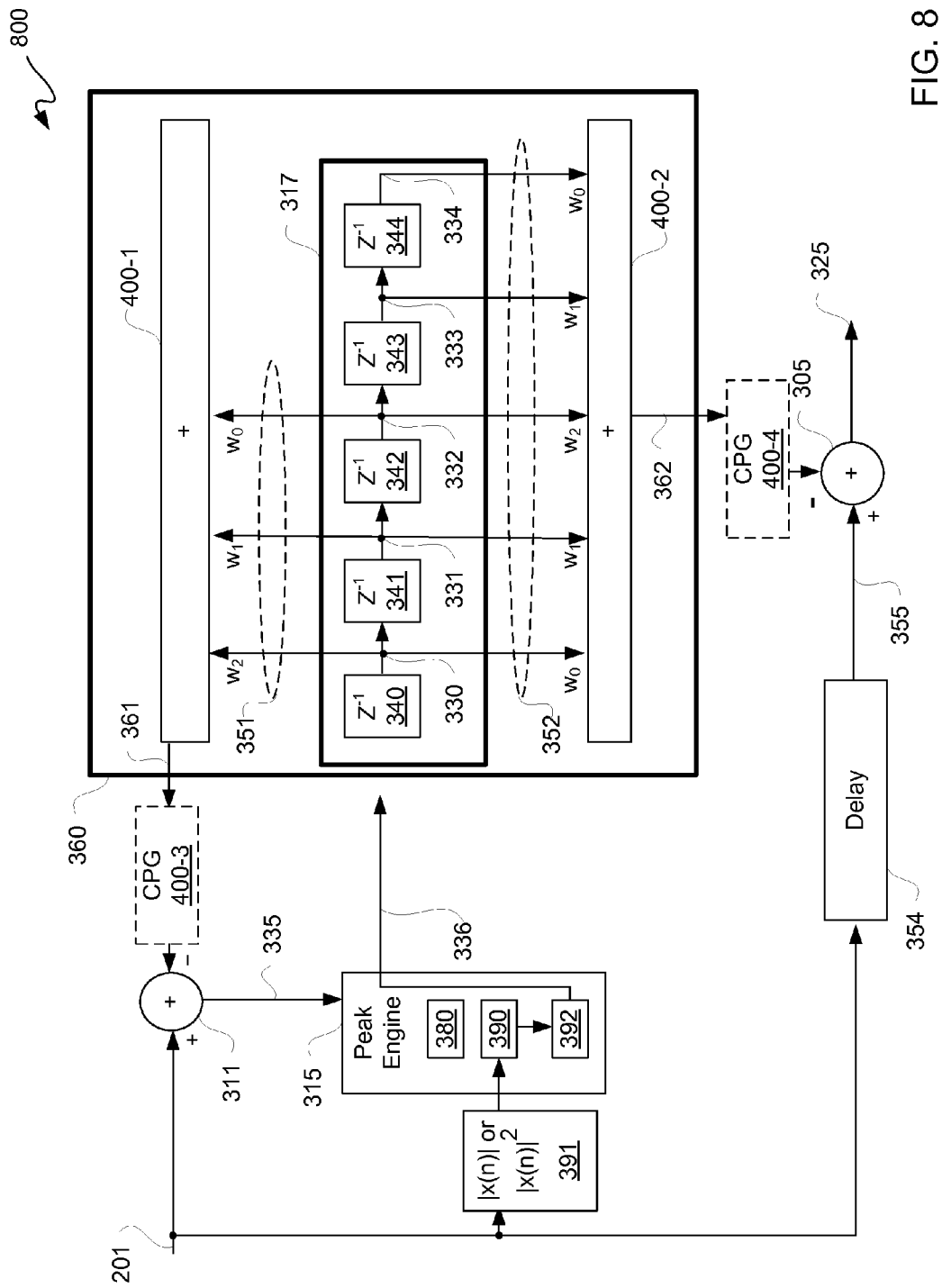

FIG. 8 is a block diagram depicting another exemplary CPCFR engine 800. CPCFR engine 800 is the same as CPCFR engine 700 of FIG. 7 with the following differences. In CPCFR engine 800, optional clean-up WCFR engines 200-1 and 200-2 have been respectively replaced with CPGs 400-3 and 400-4. CPG 400-3 is coupled between CPG 400-1 and adder 311 to clean-up cancellation pulse 361 for input to adder 311, and CPG 400-4 is coupled between CPG 400-2 and adder 305 to clean-up cancellation pulse 362 for input to adder 305.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:
1. An apparatus, comprising:
a finite impulse response filter configured to provide a first cancellation pulse and a second cancellation pulse;
a first adder coupled to receive an input signal and the first cancellation pulse to provide a first difference signal;
a peak engine coupled to receive the first difference signal and configured to provide a cancellation pulse value responsive to the first difference signal;
wherein the finite impulse response filter is coupled to receive the cancellation pulse value to provide each of the first cancellation pulse and the second cancellation pulse;
a delay coupled to receive the input signal to provide a delayed input signal; and
a second adder coupled to receive the delayed input signal and the second cancellation pulse to provide a second difference signal;
wherein the second difference signal is a crest factor reduced version of the delayed input signal.
2. The apparatus according to claim 1, wherein:
the finite impulse response filter includes a delay line coupled to receive the cancellation pulse value to provide first weighted signals and second weighted signals;
the delay line coupled between a first amplification-summation block and a second amplification-summation block of the finite impulse response filter to provide the first weighted signals to the first amplification-summation block and to provide the second weighted signals to the second amplification-summation block;

the first amplification-summation block coupled to receive the first weighted signals to provide the first cancellation pulse; and the second amplification-summation block coupled to receive the second weighted signals to provide the second cancellation pulse.

3. The apparatus according to claim 2, further comprising:
a first cancellation pulse generator coupled to receive the first cancellation pulse from the first amplification-summation block to adjust for a first fractional offset to provide the first cancellation pulse adjusted for the first fractional offset to the first adder; and
a second cancellation pulse generator coupled to receive the second cancellation pulse from the second amplification-summation block to adjust for a second fractional offset to provide the second cancellation pulse adjusted for the second fractional offset to the second adder.

4. The apparatus according to claim 1, wherein:
the finite impulse response filter includes a delay line coupled to receive the cancellation pulse value to provide first weighted signals and second weighted signals;
the delay line coupled between a first cancellation pulse generator and a second cancellation pulse generator of the finite impulse response filter to provide the first weighted signals to the first cancellation pulse generator and to provide the second weighted signals to the second cancellation pulse generator;
the first cancellation pulse generator coupled to receive the first weighted signals to provide the first cancellation pulse and configured to adjust for a first fractional offset to provide the first cancellation pulse adjusted for the first fractional offset to the first adder; and
the second cancellation pulse generator coupled to receive the second weighted signals to provide the second cancellation pulse and configured to adjust for a second fractional offset to provide the second cancellation pulse adjusted for the second fractional offset to the second adder.

5. The apparatus according to claim 4, further comprising:
a first window-crest factor reduction engine coupled to receive the first cancellation pulse from the first cancellation pulse generator to clean up the first cancellation pulse to provide to the first adder; and
a second window-crest factor reduction engine coupled to receive the second cancellation pulse from the second cancellation pulse generator to clean up the second cancellation pulse to provide to the second adder.

6. The apparatus according to claim 4, further comprising:
a third cancellation pulse generator coupled to receive the first cancellation pulse from the first cancellation pulse generator to clean up the first cancellation pulse to provide to the first adder; and
a fourth cancellation pulse generator coupled to receive the second cancellation pulse from the second cancellation pulse generator to clean up the second cancellation pulse to provide to the second adder.

7. The apparatus according to claim 1, wherein the cancellation pulse value is recursively updated responsive to a past contribution provided from the first cancellation pulse.

8. The apparatus according to claim 1, wherein the finite impulse response filter is a factored filter.

9. The apparatus according to claim 1, wherein the first cancellation pulse and the second cancellation pulse are provided to respective minus ports of the first adder and the second adder.

10. The apparatus according to claim 1, wherein the peak engine is configured with a threshold peak value T, where for the input signal x(n), the first cancellation pulse c(n), and the first difference signal y(n), for operations as:

$$y(n) = \begin{cases} 1 & |x(n)| \le T \\ \dfrac{T}{|x(n)|} & |x(n)| > T \end{cases}.$$

11. The apparatus according to claim 1, wherein:
the peak engine is includes a look-ahead block, and
the look-ahead block is configured to look-ahead for a future contribution of the input signal to determine whether a next sample of the input signal is over a threshold to set a signal phase as constant for correlated samples to simply the cancellation pulse value to only magnitude data.

12. The apparatus according to claim 11, wherein the look-ahead block is configured to subtract the future contribution using a filter function w of length 2M+1 to determine an energy of the cancellation pulse c(n:n+L−1) sufficient to drive sample magnitudes to a value below the threshold for M a positive integer greater than zero, c(n) the first cancellation pulse, and L a look-ahead value.

13. The apparatus according to claim 12, wherein the look-ahead block includes a quadratic programming function.

14. The apparatus according to claim 12, wherein the look-ahead block includes a nonlinear programming function.

15. The apparatus according to claim 12, wherein the look-ahead block includes a linear programming function for single pass crest factor reduction.

16. The apparatus according to claim 12, wherein the look-ahead block is configured to look at future samples of the input signal, to quantize the future samples over the threshold, to look back with the future samples quantized, and to apply the future samples quantized to the first difference signal to eliminate most of future and past contributions in selecting a current cancellation pulse complex gain for the cancellation pulse value.

17. A method, comprising:
obtaining a magnitude or magnitude squared of an input signal;
detecting a peak of the input signal with a peak detector;
determining a fractional time offset associated with detection of the peak;
interpolating to find a peak magnitude and a peak location of the peak detected;
determining whether the peak magnitude is greater than a threshold value;
finding a complex interpolated cancellation pulse value for a cancellation pulse gain for the peak magnitude greater than the threshold value;
generating a cancellation pulse with the cancellation pulse gain; and
outputting the cancellation pulse for crest factor reduction.

18. The method according to claim 17, further comprising setting the cancellation pulse gain to one for the peak magnitude not greater than the threshold value.

19. The method according to claim 18, wherein the detecting comprises performing a quadratic fit to a sequence of samples.

20. The method according to claim 18, wherein the interpolating includes using a quadratic fit.

* * * * *